(12) United States Patent
Green

(10) Patent No.: US 9,349,121 B2
(45) Date of Patent: May 24, 2016

(54) PROFESSIONAL SERVICE SCHEDULING SYSTEM AND METHOD

(71) Applicant: Great Justice Systems Inc., Richmond Hill (CA)

(72) Inventor: Jordan Shael Green, Toronto (CA)

( * ) Notice: Subject to any disclaimer, the term of this patent is extended or adjusted under 35 U.S.C. 154(b) by 215 days.

(21) Appl. No.: 14/317,170

(22) Filed: Jun. 27, 2014

(65) Prior Publication Data

US 2015/0379474 A1    Dec. 31, 2015

(51) Int. Cl.
*G06F 17/30*    (2006.01)
*G06Q 10/10*    (2012.01)
*G06Q 30/06*    (2012.01)

(52) U.S. Cl.
CPC ........ *G06Q 10/1093* (2013.01); *G06Q 30/0625* (2013.01)

(58) Field of Classification Search
CPC ................................ G06Q 10/00; G06F 17/30
USPC .................................................. 707/600–899
See application file for complete search history.

(56) References Cited

U.S. PATENT DOCUMENTS

| 2002/0009159 | A1  | 1/2002  | Franz |
| 2011/0320613 | A1* | 12/2011 | Mandal ................ G06Q 10/107 709/227 |
| 2012/0185401 | A1  | 7/2012  | Marusyk |

* cited by examiner

*Primary Examiner* — Isaac M Woo

(57) ABSTRACT

In one aspect, a method of providing a search of professionals includes: receiving, at a professional services scheduling server, a professional services inventory value for the professional, the professional services inventory value defining a quantity of professional services units offered by the professional; updating a memory to store the professional services inventory value in a profile associated with the professional; scheduling a booking of the professional associated with the professional services inventory value; adjusting the professional services inventory value stored in the profile for the professional associated with the scheduled booking to account for the scheduled booking; receiving a search request from a remote system associated with a prospective client; selecting search results, wherein selecting search results includes comparing the adjusted professional services inventory value to a predetermined threshold; and providing the search results to the remote system associated with the prospective client.

20 Claims, 9 Drawing Sheets

Blocked off dates

Click on dates you are unavailable to accept clients. Please note that if you book of any dates, that you will not appear in search results where 'I do not know my date' is selected << June 2014 >>

| Su | M | Tu | W | Th | F | Sa |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 Vacation X | 21 |
| 22 | 23 | 24 | 25 | 26 | 27 | 28 |
| 29 | 30 | | | | | |

FIG. 9

PROFESSIONAL SERVICE SCHEDULING SYSTEM AND METHOD

TECHNICAL FIELD

The present disclosure relates to scheduling systems and, more particularly, methods, systems and devices for booking professional services.

BACKGROUND

Computerized systems for connecting a prospective client with a professional, such as a lawyer, often allow the prospective client to search or browse for a professional in a specified geographic region. For example, numerous lawyer directories exist which allow a prospective client to search for a lawyer.

Such systems are often limited in functionality, requiring a prospective client to use traditional technology, such as a telephone to contact the professional and book the professional's services.

Thus, there exists a need for improved computerized systems for connecting a prospective client with a suitable professional.

BRIEF DESCRIPTION OF THE DRAWINGS

FIG. 5 is an example display screen for inputting a professional services inventory value;

FIG. 6 is an example display screen for inputting a search request;

FIG. 9 is an example display screen for inputting an availability indicator.

Like reference numerals are used in the drawings to denote like elements and features.

DETAILED DESCRIPTION OF EXAMPLE EMBODIMENTS

In one aspect, the present disclosure describes a processor-implemented method of providing a search of professionals. The method includes: receiving, at a professional services scheduling server and from a remote system associated with a professional, a professional services inventory value for the professional, the professional services inventory value defining a quantity of professional services units offered by the professional; updating a memory to store the professional services inventory value in a profile associated with the professional; scheduling a booking of the professional associated with the professional services inventory value; adjusting the professional services inventory value stored in the profile for the professional associated with the scheduled booking to account for the scheduled booking to account for the scheduled booking; receiving a search request from a remote system associated with a prospective client; selecting search results, wherein selecting search results includes comparing the adjusted professional services inventory value to a predetermined threshold; and providing the search results to the remote system associated with the prospective client.

In another aspect, the present disclosure describes a professional service scheduling server. The server includes a memory and a communication subsystem. The server also includes a processor coupled with the memory and the communication subsystem. The processor is configured to: receive, at a professional services scheduling server and from a remote system associated with a professional, a professional services inventory value for the professional, the professional services inventory value defining a quantity of professional services units offered by the professional; update a memory to store the professional services inventory value in a profile associated with the professional; schedule a booking of the professional associated with the professional services inventory value; adjust the professional services inventory value stored in the profile for the professional associated with the scheduled booking to account for the scheduled booking; receive a search request from a remote system associated with a prospective client; select search results, wherein selecting search results includes comparing the adjusted professional services inventory value to a predetermined threshold; and provide the search results to the remote system associated with the prospective client.

Other example embodiments of the present disclosure will be apparent to those of ordinary skill in the art from a review of the following detailed description in conjunction with the drawings.

Example System for Facilitating a Booking of a Professional

Figure 1:
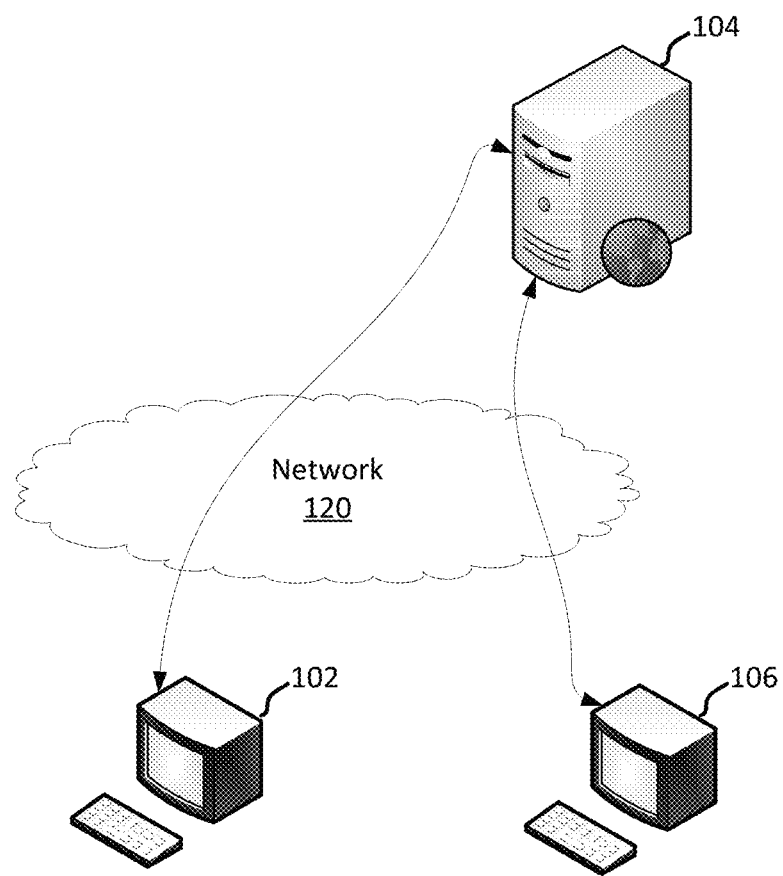
FIG. 1 is a block diagram of a system for facilitating a booking of a professional in accordance with an example embodiment of the present disclosure.

Referring now to FIG. 1, an example system for facilitating a booking of a professional is illustrated. The example system includes a number of servers and devices which connect to one another via one or more networks 120. These devices and servers function to allow a number of professionals, each associated with a remote system (which may be referred to herein as a remote system associated with a professional 102), to create their own profile (which may be referred to herein as a professional profile 282 (FIG. 2)) at a professional services scheduling server 104.

Figure 2:
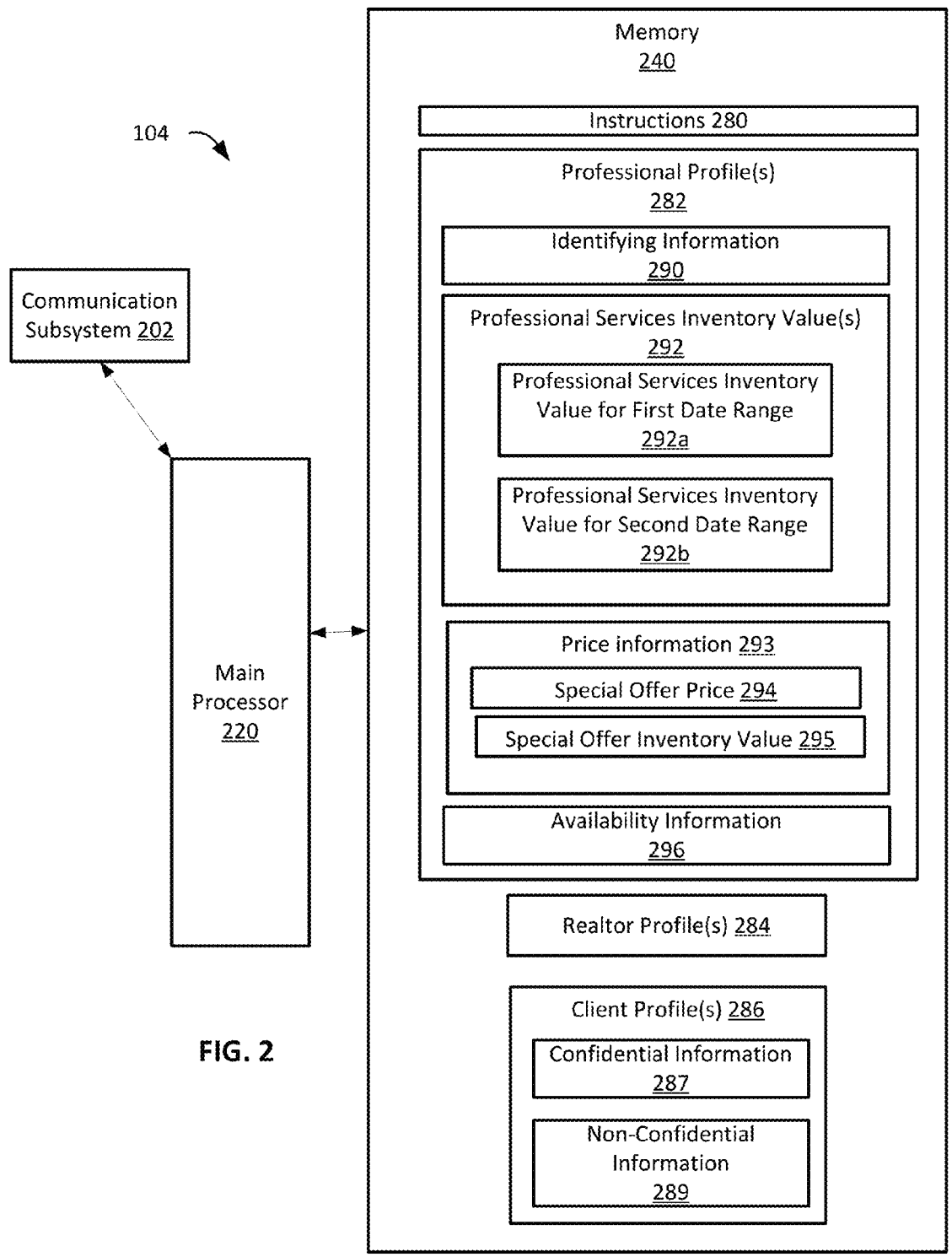
FIG. 2 is block diagram of a professional services scheduling server in accordance with an example embodiment of the present disclosure.

The professional services scheduling server 104 stores a professional profile for a plurality of different professionals. As will be discussed in greater detail below, the professional profile may include identifying information 290 such as a name of the professional. It may also include contact information such as a physical address for the professional, an email address, a telephone number, a fax number, etc. The professional profile is also configured with one or more professional services inventory value(s) 292 (FIG. 2). This value is used to define the quantity of bookings that the professional is willing to accept. As noted above, the information in the professional profile is defined using input received via the network 120 from the remote system associated with the professional 102. More particularly, the remote system may include an input interface (such as a keyboard, mouse, touch-screen display, etc.) that allows an operator of the remote system (i.e. the professional), to input data that is to be included in the professional profile and a message may be sent from the remote system to the scheduling server 104 with that data.

The professional services scheduling server 104 is accessed by a remote system associated with a prospective client 106. More particularly, a prospective client accesses the professional services scheduling server 104 to browse or search for a professional. The browsing and searching for professionals is performed using the professional profiles.

For example, as will be described in greater detail below, a professional profile may include a professional services inventory value which may be used to determine whether a professional wishes to accept a booking. If the professional does not have a sufficiently high professional services inventory value, then they may be excluded from a search by a prospective client. That is, if the professional services inventory value indicates that the professional will be unable to assist the client because they do not have sufficient capacity to do so, then that professional will automatically be excluded from search results provided to the prospective client. Accordingly, a prospective client will be unable to book a professional who does not have a sufficiently high professional services inventory value.

In addition to managing a professional's capacity to accept new bookings, the professional services scheduling server may also allow a professional to set their availability for a specific time period. For example, a professional may indicate that they are away on a particular date. If a professional indicates that they are unavailable on a particular date, then the professional services scheduling server may automatically exclude the professional from search results when a prospective client is searching for services that are required to be performed on the date when the professional is unavailable. Thus, the prospective client is unable to book a professional who is unavailable on the date when the service needs to be performed.

The professional services scheduling server 104 may also be configured to perform a conflict of interest check before finalizing a booking of a professional. For example, in some embodiments, after a prospective client has indicated a desire to hire a professional, the professional services scheduling server 104 automatically sends a message to the selected professional and also initiates a timer. The professional may respond to the message by either indicating that the professional accepts the booking and does not have any conflicts, or by indicating that the professional has a conflict and does not accept the booking. This response is received at the professional services scheduling server 104, which may take different actions depending on the response received.

In some embodiments, the professionals registered with the professional services scheduling server 104 agree to respond to such booking messages in a predetermined period of time (e.g., 24 hours). In some such embodiments, the professional services scheduling server 104 includes a timer that tracks the elapsed time after the professional services scheduling server 104 has sent the message. If the elapsed time is greater than a threshold and a response is not yet received, then the professional services scheduling server 104 may consider the booking to be accepted and may finalize the booking (e.g. by sending the prospective client a message indicating that the booking is confirmed).

Where the professional services scheduling server 104 is configured to automatically accept a booking if a response is not received within a given period of time, it may also be configured so that any confidential information associated with the booking is not provided to the professional unless the professional performs certain predetermined actions to actively request such information. For example, in some embodiments, the professional services scheduling server 104 allows a prospective client, an actual client (i.e. a person who has a confirmed booking), or a third party such as a real-estate agent, to upload documents to the professional services scheduling server 104. Such documents may be confidential and an example of a possible confidential document is an agreement of purchase and sale. When a booking is confirmed as a result of the timer timing out, such confidential information is not automatically sent to the professional. Instead, the professional services scheduling server 104 requires the professional to perform a predetermined step which requires the professional to actively do something. For example, in an embodiment, the professional services scheduling server 104 only releases the confidential information to the professional after the professional logs into the professional services scheduling server 104 using login information (e.g. username and password) associated with the professional and when the professional then selects a user interface element which activates a download of the confidential information to the professional's remote system.

The professional services scheduling server 104 may also be configured to manage promotions configured by the various professionals. For example, in some embodiments, a professional may set a special offer price. In at least some embodiments, the professional services scheduling server 104 may select a single professional based, at least in part, on the special offer price. For example, the lowest special offer price for a professional having sufficient capacity to accept a new booking may be selected. The special offer price associated with the selected professional will be presented with the search results that are provided to the remote system associated with the prospective client in response to a search request. In at least some embodiments, the identity of the professional associated with the special offer price is withheld (i.e. it is not displayed on the search results page along with the special offer price) until later in the booking process (e.g. until after a booking is confirmed).

The network 120 may include one or more public networks (such as the Internet) and/or one or more private networks (such as a private wired or wireless network).

In at least some embodiments, the professional services scheduling server 104 is a web server which may serve a website, for example.

The remote system associated with the professional 102 may, for example, be a computer including a desktop, notebook, tablet computer, smartphone, connected appliance terminal or device (including, for example, a wearable device such as a smart watch or a wearable computer with an optical head-mounted display). The remote system associated with the professional 102 may take other forms apart from those specifically recited herein.

The remote system associated with the professional 102 may, for example, include a web browser application installed thereon. In at least some embodiments, the remote system associated with the professional 102 may access the professional services scheduling server 104 using the web browser.

The remote system associated with the prospective client 106 may be of the same or a similar type as the remote system associated with the professional. For example, the remote system associated with the prospective client 106 may be a computer including a desktop, notebook, tablet computer, smartphone, connected appliance terminal or device (including, for example, a wearable device such as a smart watch or a wearable computer with an optical head-mounted display). The remote system associated with the prospective client 106 may take other forms apart from those specifically recited herein.

The remote system associated with the prospective client 106 may, for example, include a web browser application installed thereon. In at least some embodiments, the remote system associated with the prospective client 106 may access the professional services scheduling server 104 using the web browser.

While a single remote system associated with a professional 102 and a single remote system associated with a prospective client 106 are illustrated in FIG. 1, in practice, the professional services scheduling server 104 may connect with a plurality of different remote systems associated with professionals and a plurality of remote systems associated with prospective clients. This allows professional profiles for many different professionals to be created and managed at the professional services scheduling server 104 and also allows numerous prospective clients to access the professional services scheduling server 104, each using a respective remote system.

Professional Services Scheduling Server

Referring now to FIG. 2, an example professional services scheduling server 104 is illustrated in block diagram form.

The professional services scheduling server 104 includes a controller which controls overall operation of the professional services scheduling server 104. In the example, this controller is provided by a main processor 220. The main processor 220 connects to various device subsystems such as, for example, a communication subsystem 202, a power source (not shown), and at least one memory 240. It will be appreciated that the professional services scheduling server 104 will include other components that are not specifically illustrated.

The communication subsystem(s) 202 are used for connecting the professional services scheduling server 104 to other systems, servers and/or devices, such as remote systems associated with professionals 102 and remote systems associated with prospective clients 106. More particularly, the communication subsystem(s) 202 allow the professional services scheduling server 104 to send to and receive data from such remote systems.

The processor 220 is associated with at least one memory 240. The memory 240 may store data and processor-executable instructions 280 which, when executed by the processor, configure the processor 220 to perform a method described below with reference to FIG. 3 and/or FIG. 4, or a variation thereof.

At least one of the memory components coupled with the processor 220 also stores professional profiles 282 for a plurality of professionals, who are users of the system. The professional profiles 282 may, in at least some embodiments, be stored in a database. Each professional profile may be associated with login information such as a username and password that may be used to allow a professional to gain access to various functions of the system. For example, in some embodiments, the username and password may be required in order to set or update the professional profile 282.

The professional profile(s) may include identifying information 290 that may be used to identify a professional. The identifying information 290 may, for example, be a personal name (e.g. first name and last name). In some embodiments, the identifying information may include a company name, such as a law firm name. Other identifying information may be included instead of or in addition to the identifying information noted above.

In at least some embodiments, the professionals are lawyers.

The professional profile(s) may also include contact information for the professional such as one or more of an email address, telephone number, fax number, geographic address, etc.

The professional profile(s) may also include one or more professional services inventory values 292. As noted above, the professional services inventory values 292 define a quantity of professional service units offered by the professional. That is, the professional services inventory value 292 may define the professional's willingness or capacity to accept new clients and/or new matters. For example, in some embodiments, the professional services inventory value 292 is a number. If the number is greater than a predetermined threshold, then the professional is able to accept a new booking. If, however, the number is less than a threshold, then the professional is unable to accept a new booking. For example, in some embodiments, a professional may be able to accept a new booking if the professional services inventory value is greater than zero. When new bookings are scheduled, the professional services inventory value may be automatically adjusted to account for the new booking.

In at least some embodiments, the professional services inventory value may define the number of professional service units offered by a professional over a defined period of time (e.g. a week, a month, etc.). For example, a professional may configure their profile that they will accept a specific number of new bookings for each week. In at least some such embodiments, the professional services scheduling server 104 creates one or more copies of the professional services inventory value for various date ranges. For example, a first professional services inventory value 292a may be stored in association with a first range of dates (e.g. June 22 to June 28) and a second professional services inventory value 292b may be stored in association with a second range of dates (e.g. June 29 to July 5). Each of these values 292a, 292b specifies the quantity of professional services units available for the given range of dates. These values 292a, 292b may be independently adjusted based on the date associated with a new booking. For example, if a date associated with a new booking is within the first range of dates, then the first professional services inventory value 292a may be adjusted while the second professional services inventory value 292b is adjusted if the date is within the second range of dates.

In at least some embodiments, a professional services inventory value 292 may be associated with a specific type of service and multiple professional services inventory values 292 may be stored to account for multiple service offerings. For example, a professional may specify that they will accept five real estate transactions per week but only 2 wills and estate bookings per week.

The professional profile may also include price information 293. The price information specifies the fees charged by the professional for one or more services. For example, pricing information may specify the price charged for legal fees related to a home purchase, home sale, home refinancing, condo purchase, condo sale, condo refinancing, new home construction, new condo construction, will, power of attorney, incorporation, and/ or partnership agreement, etc.

In at least some embodiments, a plurality of different prices may be included in the professional profile, associated with different services. For example, a home purchase may have a different price than a will.

While not illustrated, the professional profile 282 may also include scope of service information defining the range of services offered by a professional. For example, a professional profile may indicate that the professional does not provide certain types of services (e.g. wills and estate planning), but that the professional does provide other types of services (e.g. real estate transaction services). When a search for a professional is performed by a prospective client, the scope of service information may be used to exclude professionals that do not perform the required service.

In at least some embodiments, a professional profile may store one or more special offer prices 294 and special offer inventory values 295. In at least some embodiments, the special offer price 294 is a price that will be offered to a prospective client if they book the professional without knowing the identity of the professional. That is, when a prospective client searches for a professional, the special offer price 294 may be provided with the search results but the name of the professional associated with the special offer price 294 may be withheld. The name may only be provided to the prospective client after a booking has been confirmed by the server 104.

A special offer price 294 may have a specific service associated with that price and multiple special offer prices may be defined for multiple services. For example, one special offer price may be associated with a sale of a house and another special offer price may be associated with the preparation of a will.

Each special offer price may have a special offer inventory value 295 associated therewith. The special offer inventory value specifies the quantity of professional services units offered by the professional at that price. Each special offer inventory value 295 may specify the number of professional services units offered over a defined period of time e.g., one week. In such cases, copies of the special offer inventory value 295 may be created by the professional services scheduling server in the manner described above so that the number of units available is tracked independently for different ranges of dates.

The professional profile 282 may also, in at least some embodiments, include availability information 296. The availability information indicates the availability of the professional on various dates. More particularly, a professional may provide, to the professional services scheduling server, an availability indicator associated with a specified date. The availability indicator indicates the professional's availability on the specified date. For example, the availability indicator may indicate that the professional is unavailable on a specific date. This information is stored in the professional profile 282 and may be used when generating search results for a prospective client. For example, a professional may be excluded from the search results if the professional is determined to be unavailable on a date associated with the search.

The memory 240 may also store one or more client profiles 286 and/or one or more realtor profiles 284. The realtor profile 284 may be created by and associated with a realtor who has access to the system. A realtor may be linked to a client and/or a scheduled booking so that the realtor is able to assist with the booking. For example, the realtor may be permitted to upload documents to the professional services scheduling server (such as an agreement of purchase and sale) and those documents may be stored in connection with the client profile.

The client profile 286 may be created when a prospective client makes their first booking using the professional services scheduling server. The client profile may store information identifying a client, information about past bookings using the professional services scheduling server, or other information. In at least some embodiments, a client profile 286 may include confidential information 287 and non-confidential information 289. In at least some embodiments, the confidential information may include, for example, a document associated with a transaction, such as an agreement of purchase and sale. The non-confidential information may be identifying information that may identify the client and/or a related or adverse party (e.g., if the client is a buyer of a house then the seller of the house may also be identified). In at least some embodiments, the non-confidential information is provided, by the professional services scheduling system 104, to a professional before a booking is confirmed to allow the professional to perform a conflict check to ensure that they do not have any conflicts of interest that would prevent them from accepting the booking. In some embodiments, after the booking has been confirmed, then the confidential information may be released to the professional.

While a single memory is illustrated in FIG. 2, in practice, the professional services scheduling server 104 will include a plurality of memory components of various types. Each type of memory may be suited for particular uses. By way of example, the server 104 may include a hard disk drive (HDD), a solid state drive (SSD), a flash memory, random access memory (RAM), and/or memory of another type.

Method of Providing a Search of Professionals

Figure 3:
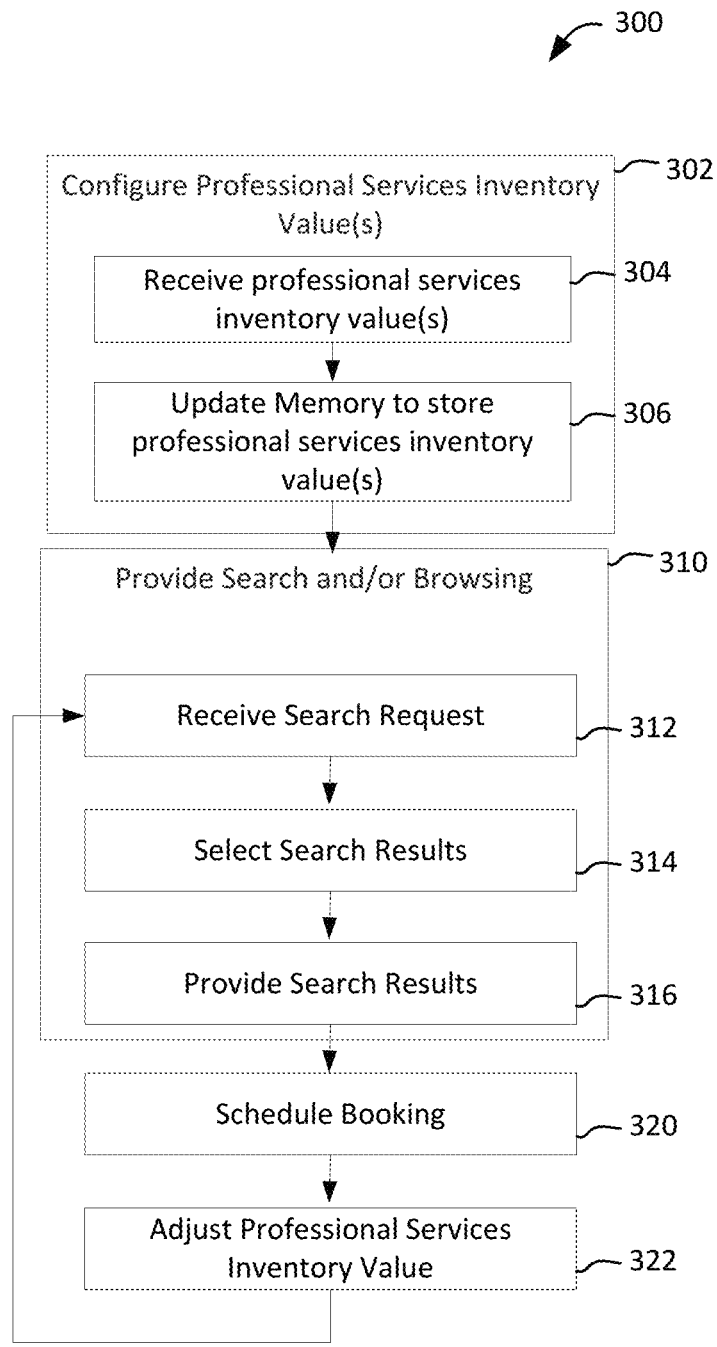
FIG. 3 is a flowchart of an example method for providing a search for professionals in accordance with example embodiments of the present disclosure.

Referring now to FIG. 3, a method 300 for providing a search of professionals is illustrated in flowchart form. In at least some embodiments, a processor associated with the professional services scheduling server 104 is configured to perform the method 300. More particularly, a memory associated with the processor may store processor-executable instructions which, when executed, configure the processor to perform the method 300 of FIG. 3.

At operation 302, the professional services scheduling server 104 configures one or more professional services inventory values. More particularly, in at least some embodiments, a remote system associated with the professional 102 accesses the professional services scheduling server 104. An interface, in the form of a web page, may be provided by the professional services scheduling server 104 to the remote system associated with the professional 102 where it is displayed as a display screen on a display associated with that system.

Figure 5:
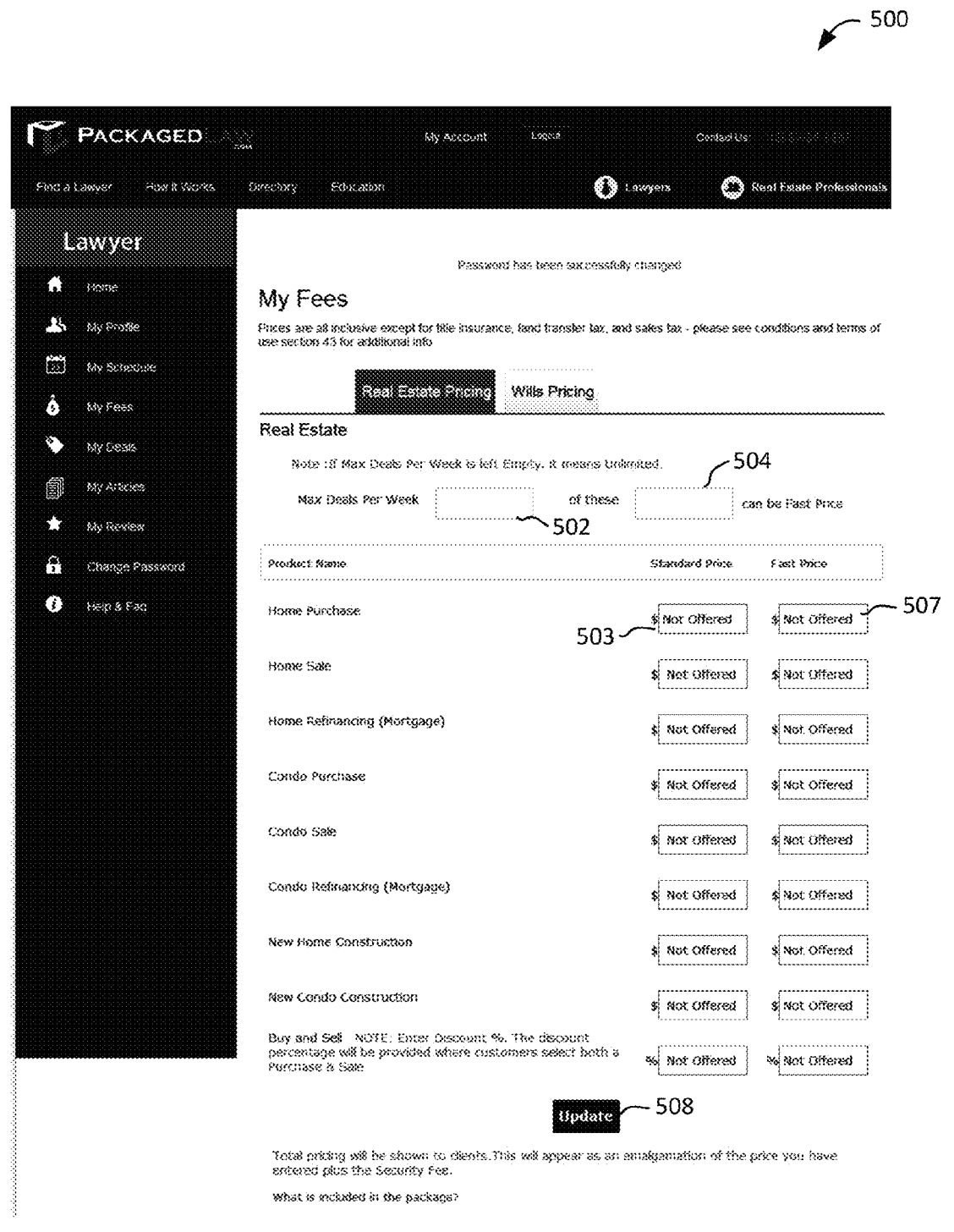

Referring briefly to FIG. 5, an example of one such display screen 500 is illustrated. The display screen 500 includes one or more interface elements for inputting information that is to be stored in a professional profile. The display screen 500 of FIG. 5 may be displayed after a professional has input login information and the login information has been successfully authenticated by the professional services scheduling server 104.

The display screen may include a form which allows for the inputting of data by the professional using an input interface associated with the remote system. In the example illustrated, a professional services inventory value field 502 is provided, which allows a professional to input a professional services inventory value. The professional services inventory value defines a quantity of professional services units offered by the professional. For example, in the example illustrated, the value indicates the number of real estate deals that the professional will accept for each week.

A separate display screen (not shown) may include another professional services inventory value field that allows the professional to input a professional services inventory value to be associated with another type of service (e.g., wills).

In at least some embodiments, the professional services inventory value field 502 may request the input of a professional services inventory value 292 that defines the quantity of professional service units offered by the professional over a defined period of time. For example, in the embodiment illustrated, the professional services inventory value defines the quantity of professional service units offered by the professional each week. In other embodiments, this period of time may be different; for example, a month.

The form provided on the display screen may include other fields. For example, in the example illustrated, pricing information may be input via one or more pricing fields 503. A plurality of pricing fields are provided in the example to allow a professional to specify different prices for different services. Thus, each pricing field 503 is, in the example illustrated, associated with a specific service.

In the example illustrated, the form also allows a special offer price 294 and a special offer professional services inventory value 295 to be input. The special offer professional services inventory value may be input via a special offer inventory field 504. The special offer professional services inventory value defines the number of special offer professional services units that the professional is willing to accept. The special offer inventory field 504 may request the input of a special offer professional services inventory value that defines the quantity of professional service units offered by the professional over a defined period of time (e.g. per week, per month, etc.).

The display screen 500 may also allow for the input of one or more special offer prices (e.g, through a special offer price field 507). The special offer price field 507 allows a professional to submit a discounted price that will be offered to a prospective client who agrees to certain conditions that aren't present with a non-discounted offer. For example, in an embodiment, when a prospective client selects the special offer promotion, they are informed of the special offer price but they do not know the identity of the professional until after the booking has been completed.

The display screen 500 also allows a professional to indicate that certain services are not offered by the professional. In the example, when a price field 503 associated with a specific service is left empty, this signals to the professional services scheduling server 104 that the professional does not provide the associated service.

In the example illustrated, the display screen 500 includes a submit button 508 which, when activated, causes the contents of the fields provided on the display screen to be sent back to the professional services scheduling server. In at least some embodiments, the contents of the fields are returned using an HTTP "post" method.

Accordingly, the information input into the fields may be received at the professional services scheduling server 104. For example, referring again to FIG. 3, the method includes, at operation 304, receiving, at a professional services scheduling server and from a remote system associated with a professional, the professional services inventory value for the professional. For example, the contents of the form provided on the display screen 500 (FIG. 5) may be received. Similarly, the pricing information, special offer price and/or one or more special offer professional services inventory value may also be received at the professional services scheduling server at operation 304.

At operation 306, the professional services scheduling server updates a memory to store at least some of the information received at operation 304. That is, the professional profile is updated based on this information. For example, the memory may be updated to store the professional services inventory value in a profile associated with the professional. The memory may also be updated to store the special offer price 294 (e.g. which was input into the associated field 507), a special offer professional services inventory value (e.g. which was input into the associated field 504), pricing information (which was input into the associated field 503), and/or an indication of services that are not offered by the professional.

As noted above, in at least some embodiments, the professional services inventory value may define the quantity of professional service units offered by the professional over a defined period of time. In at least some such embodiments, copies of the professional services inventory value may be created for different ranges of dates. For example, based on the received professional services inventory value, a first professional services inventory value may be stored in association with a first range of dates having a duration equal to the defined period of time and a second professional services inventory value may be stored in association with a second range of dates having a duration equal to the defined period of time.

Other information may be received and stored at the professional services scheduling server 104 instead of or in addition to the information described above. For example, referring briefly to FIG. 9, another example display screen 900 is illustrated. The example display screen 900 allows for the inputting of an availability indicator. This display screen 900 may be provided from the professional services scheduling server to the remote system associated with a professional and displayed on a display associated with the remote system.

A user of the remote system associated with the professional may interact with the display screen 900 to "book off" dates. That is, the user may interact with the display screen to input an availability indicator. The availability indicator indicates the availability of the professional on a specific date. For example, a professional may indicate that they are unavailable on a specific date or set of dates. Such availability indicators may be provided from the remote system to the professional services scheduling server where they are received and stored.

Professional profiles may be established for a number of different professionals using the operations described above and sometime thereafter, search and/or browsing of the professional profiles may be provided to a prospective client associated with another remote system (at operation 310).

This operation 310 may include, at operation 312, receiving a search request from a remote system associated with a prospective client.

Figure 6:
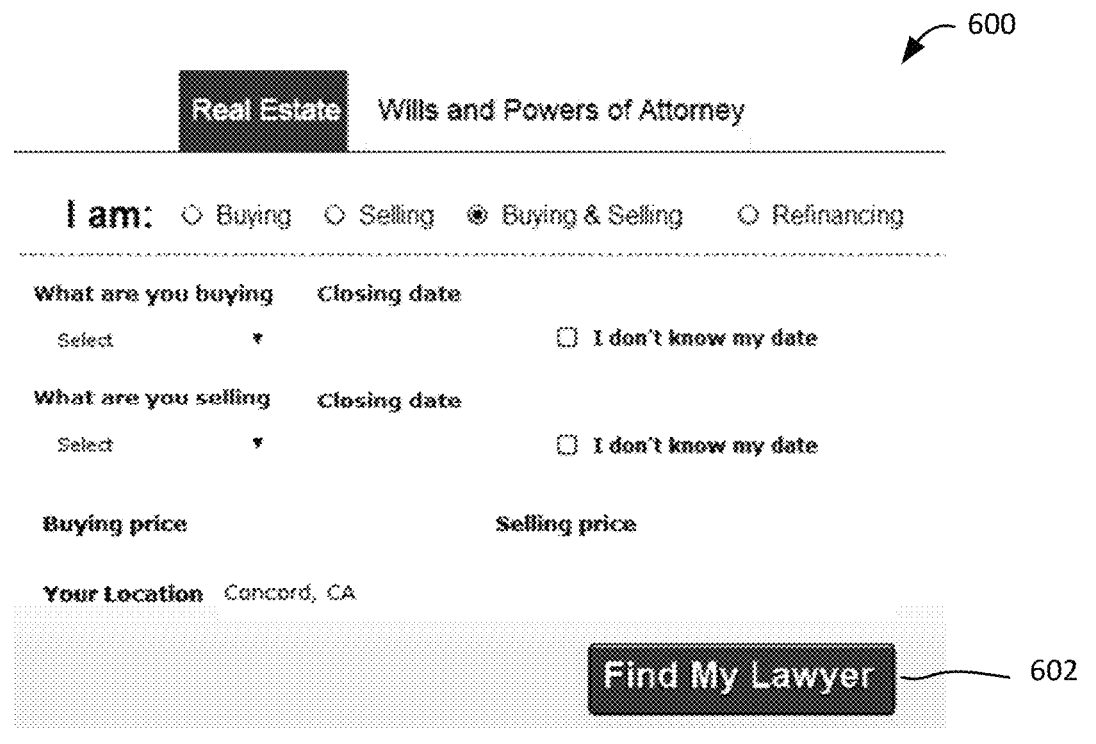

More particularly, the professional services scheduling server 104 may generate a search display screen 600, an example of which is described in FIG. 6. The search display screen 600 is provided as a web page to the remote system associated with the prospective client, where it is displayed. This display screen includes interface elements such as fields, checkboxes, etc., that are configured to receive search parameters. A submit button 602 causes the contents of these interface elements (i.e. the search parameters) to be sent to the professional services scheduling server, where they are received.

Referring again to FIG. 3, at operation 314, search results are selected. The selection of search results is performed by comparing the professional services inventory value(s) 292 in one or more professional profiles to a predetermined threshold to determine whether each professional has capacity to accept the booking. For example, in some embodiments, the threshold may be zero. If the professional services inventory value for a professional is greater than zero, then the professional can accept the booking. If it is equal to zero, then they cannot accept the booking. If the professional does not have sufficient capacity to accept the booking, then the professional may be excluded from the search results. That is, the professional may be excluded from the search results if the comparison of the professional's professional services inventory value to the predetermined threshold indicates that the professional does not have sufficient professional service units to accept a booking associated with the search request.

As noted above, in at least some embodiments, the professional services inventory value may define a quantity of professional service units offered by a professional over a predetermined period of time (e.g., a week, a month, etc.). In at least some such embodiments, the selection of search results may, therefore, take into account a date associated with a search request. That is, various instances of professional services inventory values may be created, each associated with a different range of dates. A date associated with the search results may be identified and a professional services inventory value is then identified based on the date associated with the search request. More particularly, if the date associated with a search request falls within a first range of dates associated with a first professional services inventory value, then the first professional services inventory value may be used for the purposes of assessing whether the professional has capacity (i.e. and, accordingly, whether they will be included in the search results). If, however, the date associated with the search request falls within a second range of dates associated with a second professional services inventory value, then the second professional services inventory value may be used for the purposes of assessing whether the professional has capacity.

Filtering of professionals may be performed based on other data in the professional profile instead of or in addition to professional services inventory value. For example, in at least some embodiments, the search request includes a date associated with the search request and search results may be selected, at least in part, by filtering (i.e. excluding), from the search results, a professional if an availability indicator has been received from the professional which indicates that the professional is not available on the date associated with the request (e.g. if the professional has booked off that date).

The date associated with the search request is, in at least some embodiments, a date when a service associated with the booking is required to be performed. For example, the service may be associated with a real estate transaction and the date may be a closing date for the transaction. The date may, for example, be specified by the prospective client as part of the search parameters that are input to the search display screen.

In at least some embodiments, regular search results may be selected using the techniques described above and a special offer search result may also be selected. The special offer search result may be selected by identifying, from a set of professionals having a special offer professional services inventory value greater than a predetermined threshold (e.g., zero), the professional having the lowest special offer price for the type of service associated with the search request. That is, the special offer price essentially acts as a bid and the lowest bidder is given the opportunity to have their special offer price included in the search results as a promotional price.

At operation 316, the search results are provided to the remote system associated with the prospective client. As noted above, in at least some embodiments, an indication of a special offer price associated with an identified professional may be provided to the remote system associated with the prospective client in response to the search request. The name of the professional associated with the special offer price may be withheld.

Figure 7:
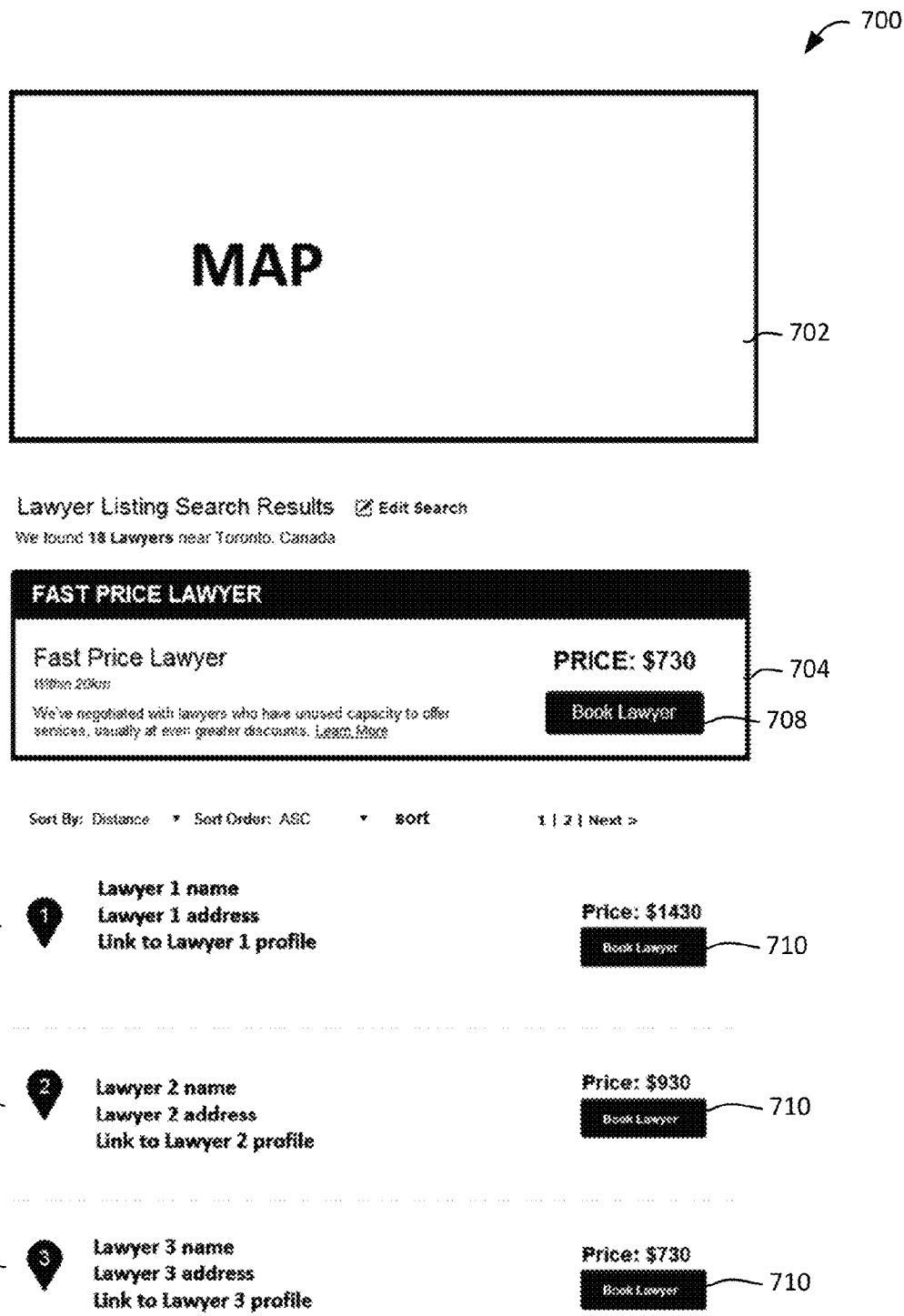
FIG. 7 is an example display screen for providing search results.
Figure 8:
FIG. 8 is an example display screen for receiving a request to hire a professional.

Referring now to FIG. 7, example search results are illustrated on a search results display screen 700. The search results display screen 700 is provided as a web page to the remote system associated with the prospective client, where it is displayed. As noted above, this display screen may be provided after a search request has been submitted to the personal services scheduling server (e.g. using a submit button associated with the search display screen 600 (FIG. 6)).

This display screen 700 communicates the search results to the prospective client. That is, search results 706 are included which identify a person or company that was selected at operation 314. For example, the name of a lawyer, the address of the lawyer and a link to the lawyer's profile is provided on the display screen 700. The pricing information that has been set by the professional for the searched service is also provided in the search results 706.

A plurality of search results 706 are included on the display screen 700. In the example illustrated, three search results are provided. However, the number of search results could be greater or less than three in other embodiments.

In the example illustrated, a special offer price 704 is identified on the display screen 700. The display screen 700 does not indicate the identity of the professional associated with the special offer price 704. That is, a prospective client is unable to determined, from the display screen 700 the identity of the professional who will be booked if the prospective client accepts the special offer.

In at least some embodiments, a map 702 is provided on the display screen 700. While not illustrated, the map may plot the location of the professionals included in the search results 706.

The search results display screen 700 may also include one or more selectable interface elements which allow a prospective client to vary the sorting order of the search results 706.

Selectable interface elements 708, 710 are also included to allow a prospective client to book a specific professional. Each interface element 708, 710 is, in the example, a virtual button that is associated with a specific one of the professionals. A prospective client may select one of these interface elements 708, 710 to initiate the booking process.

In at least some embodiments, selection of one of these interface elements 708, 710 may cause a message to be sent from the remote system associated with the prospective client to the professional services scheduling server 104. This message informs the professional services scheduling server 104 that the prospective client would like to book a specific professional (or, if the interface element 708 that is associated with the special offer price is selected, that they would like to book whatever professional is associated with the special offer price). From this message, the professional services scheduling server 104 is able to determine the identity of the professional associated with the request.

In response to receiving the message from the professional services scheduling server 104, the professional services scheduling server 104 generates another web page, based on the identity of the professional. This web page is provided to the remote system associated with the prospective client. A booking display screen 800 is then displayed on the remote system. That is, the received web page is displayed.

The booking display screen 800 includes fields that allow the prospective client to input information about the prospective client. This information may be sent to the professional services management server (e.g. when a submit button is selected) and may be stored in a client profile. In the example, the booking display screen 800 allows for the input of a first name, last name, password, email address, and phone number. Additionally, a field is provided which allows the prospective client to input information about other parties (e.g. adverse parties, spouses involved in the transaction/service, etc.). All of this information, apart from the password (which is never released to the professional) is treated as non-confidential information and may be sent to the professional during the booking process before the booking is finalized to allow the professional to perform a conflict check.

The booking display screen 800 or other display screens (not illustrated) that are provided during the booking process may allow for the input of other information including, for example, a billing address, payment details, and/or confidential information such as confidential documents.

The data that is required by the booking display screen(s) is received at the professional services scheduling server and, referring again to FIG. 3, at operation 320 a booking of the professional may then be scheduled. Techniques for scheduling a booking will be discussed below with reference to FIG. 4.

After a booking has been confirmed, at operation 322, a professional services inventory value stored in the profile for the professional associated with the scheduled booking is adjusted to account for the scheduled booking.

In at least some embodiments, the adjustment of the professional services inventory value may reduce this value by a predetermined amount (e.g. by a single unit in some embodiments). For example, in some embodiments, the professional services inventory value is an integer and it may be reduced by a predetermined amount which is also an integer.

In some embodiments, the amount by which the professional services inventory value is reduced may depend on the specific service being performed. More particularly, each type of service may be associated, in memory, with a predetermined adjustment value, which may be different for different types of services. When adjusting the professional services inventory value, the professional services scheduling server may first determine the adjustment value for the specific service associated with the booking and may adjust the professional service inventory value using that adjustment value. This type of adjustment recognizes that different services may require a different amount of work. In at least some embodiments, the adjustment values may be configured by the professionals and may be stored in the professional profiles. In other embodiments, the adjustment values may not be configurable by the professionals and may, instead, be the same for all professionals.

As noted above, in at least some embodiments, the professional services inventory value may specify the number of services accepted over a specific period of time (e.g. a week, a month, etc.). In such cases, the adjusting of the professional services inventory value may depend on the date associated with the booking. For example, a first professional services inventory value associated with a first range of dates may be adjusted if a date associated with the booking is within the first range of dates and a second professional services inventory value may be adjusted if a date associated with the booking is within the second range of dates.

The date that is associated with the booking may, in at least some embodiments, be the date when the scheduling of the booking is performed. For example, the date may be the date when the prospective client books the professional. This may be the case, for example, when the booking is associated with a professional service (such as a legal service) that does not have to occur on a specific date. For example, the preparation of a will may not need to occur on a certain date so the date that is used may be the date when the booking is made.

In some embodiments, the date that is associated with the booking may be the date when the service associated with the booking is required to be performed. For example, the service associated with the booking may be a legal service related to a transaction for the purchase or sale of a house and the date associated with the booking may be the closing date for the transaction.

While not illustrated in FIG. 3, in some embodiments, increases may also be made to the professional services inventory value. For example, in some embodiments, the professional services scheduling server may send a message to an address associated with the professional when a predetermined trigger condition is detected. This trigger condition may, for example, occur when the professional services inventory value drops below a threshold. The message may request input to increase the professional services inventory value. After the message is sent, a response to the message may be received which requests the professional services inventory value to be increased. In response to receiving such a request, the professional services scheduling server may automatically increase the professional services inventory value. The value may be increased by a predetermined amount or by an amount specified in the request received from the remote system associated with the professional.

After the professional services inventory value has been adjusted (either increasing it, or decreasing it as the case may be), subsequent search requests may be received (i.e. operation 312 may again be performed). When search results are selected at operation 314 for such subsequent requests, these search results are selected based on the adjusted professional services inventory value.

Figure 4:
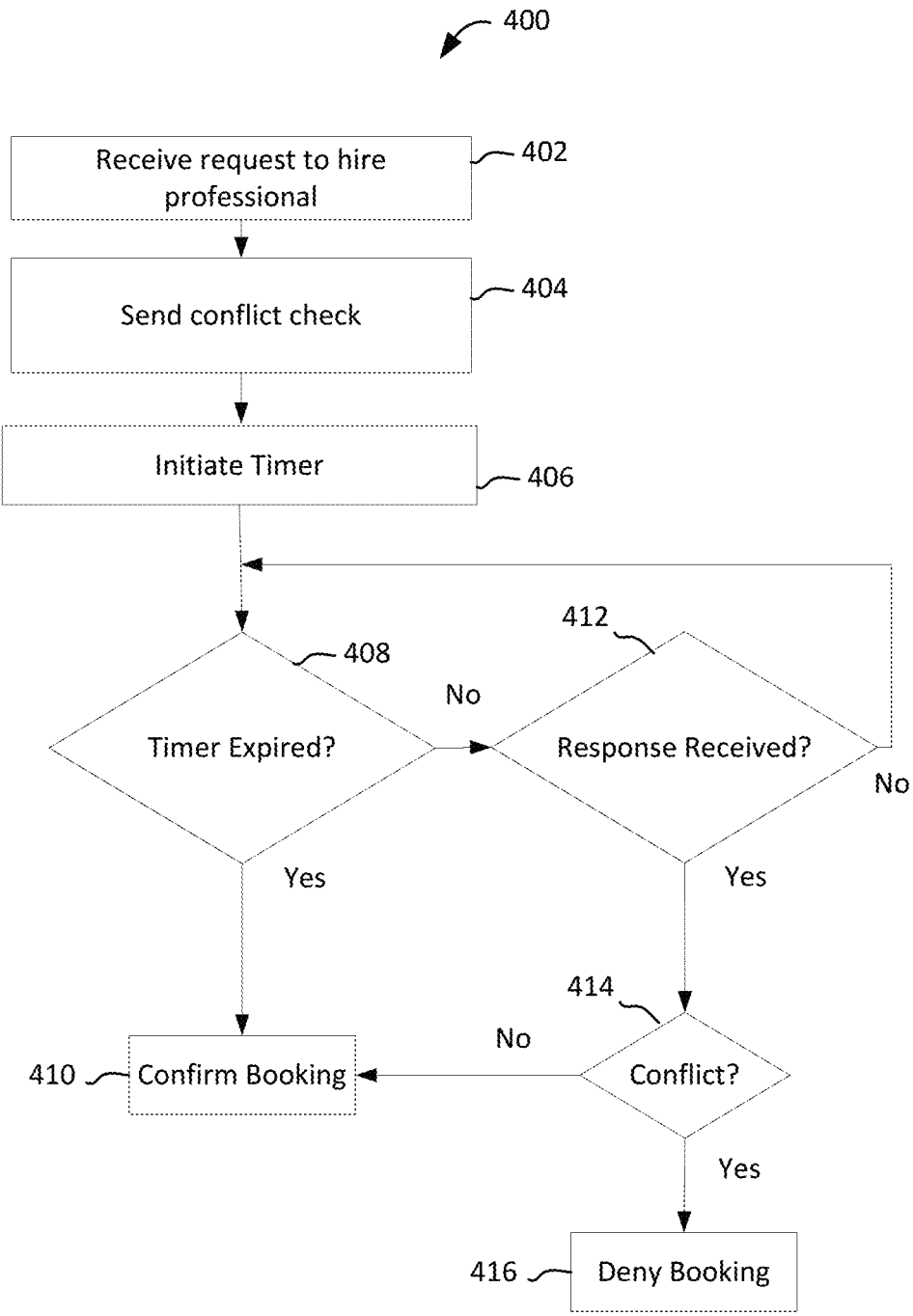
FIG. 4 is a flowchart of an example method of facilitating a booking of a professional in accordance with example embodiments of the present disclosure.

Referring now to FIG. 4, an example method 400 of scheduling a booking is illustrated in flowchart form. In at least some embodiments, a processor associated with the professional services scheduling server 104 is configured to perform the method 400. More particularly, a memory associated with the processor may store processor-executable instructions which, when executed, configure the processor to perform the method 400 of FIG. 4. The method 400 is, in at least some embodiments, performed during operation 320 of FIG. 3.

At operation 402, a request to hire a professional is received from a remote system associated with a prospective client. This may, for example, be received after a prospective client has input the information required by the booking display screen(s) 800.

At operation 404, in response to receiving the request to hire the selected professional, a conflict check request is sent to an address associated with the selected professional. The address may be an email address that may be retrieved from the professional profile for the professional associated with the request that was received at operation 402.

In at least some embodiments, the conflict check email includes non-confidential information received from the prospective client but excludes confidential information received from the client.

At operation 406, a timer is initiated at the professional services scheduling server 104. The timer tracks the amount of time that a professional has had to respond to the request.

At operation 408, the professional services scheduling server 104 determines whether the timer has expired. The timer may be configured to expire after a predetermined period of time (e.g., 24 hours, 48 hours, etc.).

If the timer expires before a response to the conflict check request is received, the booking may be confirmed at operation 410. That is, the booking is finalized. The prospective client and/or the professional may be sent a message notifying them of the booking and memory associated with the professional services management system 104 may be updated to indicate that the booking is finalized.

In some embodiments, after the booking is confirmed, the professional may be provided with access to confidential information associated with the service after the professional has logged into the professional service scheduling server 104. This confidential information may, for example, be confidential documents relating to the service, which may be received from the client or a third party such as a realtor.

The professional may be provided with access to confidential information after the conflict has been confirmed in other ways apart from those described above in other embodiments. For example, in some embodiments, the professional may be provided a code that may be used to access the confidential information at the professional services management server or another server storing the confidential information. In some embodiments, a message may be sent from the professional services management server to another server that stores confidential information, informing the other server that the confidential information may be released to the professional.

If, however, the timer has not expired, the professional services scheduling server 104 determines whether a response to the conflict check message has been received (at operation 412). If the response has not been received and the timer has not expired, then the professional services scheduling server 104 continues to wait for one of these events to occur.

If a response is received, at operation 414, the professional services scheduling server 104 determines whether the response indicates that a conflict exists. If a conflict does not exist, then the booking is confirmed at operation 410 (which was described above).

If, however, the response indicated that a conflict exists and the professional is unable to accept the booking, then the booking is denied at operation 416. When this happens, the prospective client is automatically sent a message informing them that the booking was denied (e.g., a message is sent to an email address stored in the client's profile). In some embodiments, a further search may be performed based on the original search parameters received from the prospective client (which may have been stored at the professional services management server when received) and the search results may be provided in the message. The professional who had a conflict is, however, automatically excluded from these search results.

In some embodiments, instead of including search results in the message itself, a link may be provided which links to the search results.

The various embodiments presented above are merely examples. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A processor-implemented method of providing a search of professionals, the method comprising:

receiving, at a professional services scheduling server and from a remote system associated with a professional, a professional services inventory value for the professional, the professional services inventory value defining a quantity of professional services units offered by the professional;

updating a memory to store the professional services inventory value in a profile associated with the professional;

scheduling a booking of the professional associated with the professional services inventory value;

adjusting the professional services inventory value stored in the profile for the professional associated with the scheduled booking to account for the scheduled booking;

receiving a search request from a remote system associated with a prospective client;

selecting search results, wherein selecting search results includes comparing the adjusted professional services inventory value to a predetermined threshold; and providing the search results to the remote system associated with the prospective client.

2. The method of claim 1, wherein the professional services inventory value received from the remote system associated with the professional defines the quantity of professional service units offered by the professional over a defined period of time and wherein updating the memory includes, based on the received professional services inventory value, storing a first professional services inventory value in association with a first range of dates having a duration equal to the defined period of time, and wherein adjusting the professional services inventory value comprises adjusting the first professional services inventory value if a date associated with the booking is within the first range of dates.

3. The method of claim 2, wherein updating further comprises:

based on the received professional services inventory value, storing a second professional services inventory value in association with a second range of dates having a duration equal to the defined period of time, and wherein adjusting the professional services inventory value comprises adjusting the second professional services inventory value if a date associated with the booking is within the second range of dates.

4. The method of claim 2, wherein the defined period of time is a week.

5. The method of claim 2, wherein the defined period of time is a month.

6. The method of claim 2, wherein the date associated with the booking is the date when the scheduling of the booking is performed.

7. The method of claim 6, wherein the booking is associated with a legal service that does not have to occur on a specific date.

8. The method of claim 2, wherein the date associated with the booking is the date when a service associated with the booking is required to be performed.

9. The method of claim 8, wherein the service associated with the booking is a legal service related to a transaction for the purchase or sale of a house and the date associated with the booking is the closing date for the transaction.

10. The method of claim 2, wherein selecting search results comprises:

identifying a date associated with the search request and identifying a professional services inventory value based on the date associated with the search request and wherein comparing the adjusted professional services inventory value comprises comparing the identified professional services inventory value to the predetermined threshold.

11. The method of claim 10, wherein selecting search results comprises:
excluding the professional associated with the professional services inventory value from the search results if the comparison of the identified professional services inventory value to the predetermined threshold indicates that the professional does not have sufficient professional service units to accept a booking associated with the search request.

12. The method of claim 1 further comprising:
receiving, at the professional services scheduling server and from the remote system associated with the professional, an availability indicator associated with a specified date, the availability indicator indicating the availability of the professional on the specified date, and wherein the search request includes a date associated with the search request, and wherein selecting search results comprises filtering, from the search results, the professional if the availability indicator indicates that the professional is not available on the date associated with the search request.

13. The method of claim 1, further comprising:
receiving, at a professional services scheduling server and from the remote system associated with the professional, a special offer price and a special offer professional services inventory value, the special offer professional services inventory value indicating a number of special offer professional services units associated with the professional;
updating a memory to store the special offer professional services inventory value in the profile associated with the professional;
identifying, from a set of professionals having a special offer professional services inventory value greater than a predetermined threshold, the professional having the lowest special offer price; and
providing an indication of the special offer price associated with the identified professional to the remote system associated with the prospective client in response to receiving the search request.

14. The method of claim 1, wherein scheduling a booking of the professional associated with the professional services inventory value comprises:
receiving a request to hire a selected professional from a remote system associated with a prospective client;
in response to receiving the request to hire the selected professional, sending a conflict check request to an address associated with the selected professional and initiating a timer; and
detecting the expiration of the timer before a response to the conflict check request is received and, in response, confirming the booking.

15. The method of claim 14, further comprising:
receiving confidential information and non-confidential information from the remote system associated with the prospective client;
storing the confidential information on a memory associated with the professional services scheduling server; and
after the booking is confirmed, providing the selected professional with access to the confidential information on the memory associated with the professional service scheduling server after the professional has logged into the professional service scheduling server,
and wherein the conflict check request includes the non-confidential information but not the confidential information.

16. The method of claim 1, further comprising:
sending a message to an address associated with the professional associated with the professional services inventory value to request input to increase the professional services inventory value;
receiving a response to the message, the response requesting the professional services inventory value to be increased; and
in response to receiving the response to the message, increasing the professional services inventory value.

17. The method of claim 1, further comprising:
after providing the search results to the remote system associated with the prospective client:
receiving a request to hire a selected professional from a remote system associated with a prospective client;
in response to receiving the request to hire the selected professional, sending a conflict check request to an address associated with the selected professional;
receiving a response indicating that a conflict exists; and
in response to receiving the response indicating that a conflict exists, generating new search results based on search parameters associated with the search request, the new search results filtered to remove the professional that indicated that a conflict exists;
sending a message to the prospective client based on the new search results.

18. A professional service scheduling server comprising:
a memory;
a communication subsystem;
a processor coupled with the memory and the communication subsystem, the processor configured to:
receive, at a professional services scheduling server and from a remote system associated with a professional, a professional services inventory value for the professional, the professional services inventory value defining a quantity of professional services units offered by the professional;
update a memory to store the professional services inventory value in a profile associated with the professional;
schedule a booking of the professional associated with the professional services inventory value;
adjust the professional services inventory value stored in the profile for the professional associated with the scheduled booking to account for the scheduled booking;
receive a search request from a remote system associated with a prospective client;
select search results, wherein selecting search results includes comparing the adjusted professional services inventory value to a predetermined threshold; and
provide the search results to the remote system associated with the prospective client.

19. The professional service scheduling server of claim 18, wherein the professional service scheduling server is a web server and wherein the processor is configured to provide web pages to the remote system associated with the professional and the remote system associated with the prospective client.

20. The professional services scheduling server of claim 18, wherein the professional services inventory value received from the remote system associated with the professional defines the quantity of professional service units offered by the professional over a defined period of time and wherein updating the memory includes, based on the received professional services inventory value, storing a first professional services inventory value in association with a first range of dates having a duration equal to the defined period of time, and wherein adjusting the professional services inventory value comprises adjusting the first professional services inventory value if a date associated with the booking is within the first range of dates.

* * * * *